(12) United States Patent
Grochowski et al.

(10) Patent No.: US 7,422,536 B2
(45) Date of Patent: Sep. 9, 2008

(54) METHOD AND APPARATUS FOR COOLING AND LUBRICATING A BEARING DEVICE

(75) Inventors: Edwin T. Grochowski, Howell, MI (US); Paul D. Stevenson, Ann Arbor, MI (US); Elizabeth I. Wooden, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 249 days.

(21) Appl. No.: 11/375,489

(22) Filed: Mar. 14, 2006

(65) Prior Publication Data

US 2007/0219037 A1   Sep. 20, 2007

(51) Int. Cl.
*F16H 57/04* (2006.01)
(52) U.S. Cl. .................................. 475/159
(58) Field of Classification Search ............. 475/331, 475/348, 159
See application file for complete search history.

(56) References Cited

U.S. PATENT DOCUMENTS

| | | | | |
|---|---|---|---|---|
| 5,702,320 A * | 12/1997 | Brassai et al. | ........... | 475/159 |
| 6,602,158 B2 * | 8/2003 | Wildeshaus | ........... | 475/159 |
| 7,001,298 B2 * | 2/2006 | Biermann et al. | ........... | 475/116 |
| 7,270,620 B2 * | 9/2007 | Tiesler et al. | ........... | 475/159 |
| 2006/0287152 A1 * | 12/2006 | Bishop et al. | ........... | 475/159 |

* cited by examiner

*Primary Examiner*—Dirk Wright

(57) ABSTRACT

The present invention provides a method and apparatus for cooling and lubricating a pinion bearing of an automatic transmission. The apparatus preferably includes a carrier assembly partially defining a centrifugal compensation oil reservoir. A pinion shaft is supported by the carrier assembly. The pinion shaft defines an internal channel in fluid communication with the oil reservoir. The apparatus of the present invention also includes a generally annular pinion gear member circumscribing at least a portion of the pinion shaft, and a pinion bearing disposed radially between the pinion shaft and the pinion gear member. The pinion bearing is adapted to facilitate rotation of the pinion gear member relative to the pinion shaft. The pinion bearing is aligned with the channel such that oil transferred therethrough is applied to the pinion bearing, and the pinion bearing is accordingly cooled and lubricated by the oil. A corresponding method for cooling and lubricating the pinion bearing is also provided.

18 Claims, 1 Drawing Sheet

US 7,422,536 B2

METHOD AND APPARATUS FOR COOLING AND LUBRICATING A BEARING DEVICE

TECHNICAL FIELD

The present invention pertains generally to a method and apparatus for cooling and lubricating a bearing device of an automatic transmission.

BACKGROUND OF THE INVENTION

It is well known to provide bearing devices such as ball bearings or roller bearings disposed between rotating components to reduce friction and thereby improve the operational efficiency of a given apparatus. Lubricants such as oil are commonly applied to such bearing devices to further reduce friction and remove heat. During operation, bearing devices can generate excessive heat which may degrade bearing performance. Accordingly, for some applications, it may be necessary to cool the bearing device in order to maintain optimal performance. It is also well known to provide a volume of oil in a balance dam or balance chamber whose centrifugally generated pressure pushes against a clutch piston to compensate for, and cancel the effect of, the centrifugally generated pressure in the oil between the clutch piston and a clutch housing.

SUMMARY OF THE INVENTION

The apparatus for cooling and lubricating a bearing device preferably includes a carrier assembly partially defining an oil reservoir. A pinion shaft is non-rotatably supported by the carrier assembly. The pinion shaft preferably defines an axial channel and a radial channel. The axial channel has an inlet portion in fluid communication with the oil reservoir and an outlet portion. The radial channel is in fluid communication with the outlet portion of the axial channel. The apparatus of the present invention preferably also includes a generally annular pinion gear member circumscribing at least a portion of the pinion shaft, and a pinion bearing disposed radially between the pinion shaft and the pinion gear member. The pinion bearing is adapted to facilitate rotation of the pinion gear member relative to the pinion shaft. The pinion bearing is aligned with the radial channel such that oil transferred through the axial channel and the radial channel is applied to the pinion bearing, and the pinion bearing is accordingly cooled and lubricated by the oil.

The preferred method of the present invention is preferably initiated using the carrier to form one surface defining a centrifugal pressure compensation reservoir to provide better clutch shifting control, and by transferring oil from the reservoir into the axial channel of the pinion shaft. The oil is then transferred from the axial channel to the radial channel. Thereafter, the oil is transferred from the radial channel onto the pinion bearing such that the pinion bearing is cooled and lubricated by the oil.

The bearing device is preferably a needle bearing device.

The carrier assembly preferably defines a seal groove containing a seal that is configured to retain the oil within the oil reservoir which is already implemented for the centrifugal compensation function.

A bushing is preferably provided to support the carrier assembly and to seal the oil reservoir.

The oil in the oil reservoir is preferably pressurized to facilitate the transfer of the oil through the axial and radial channels and onto the bearing device.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
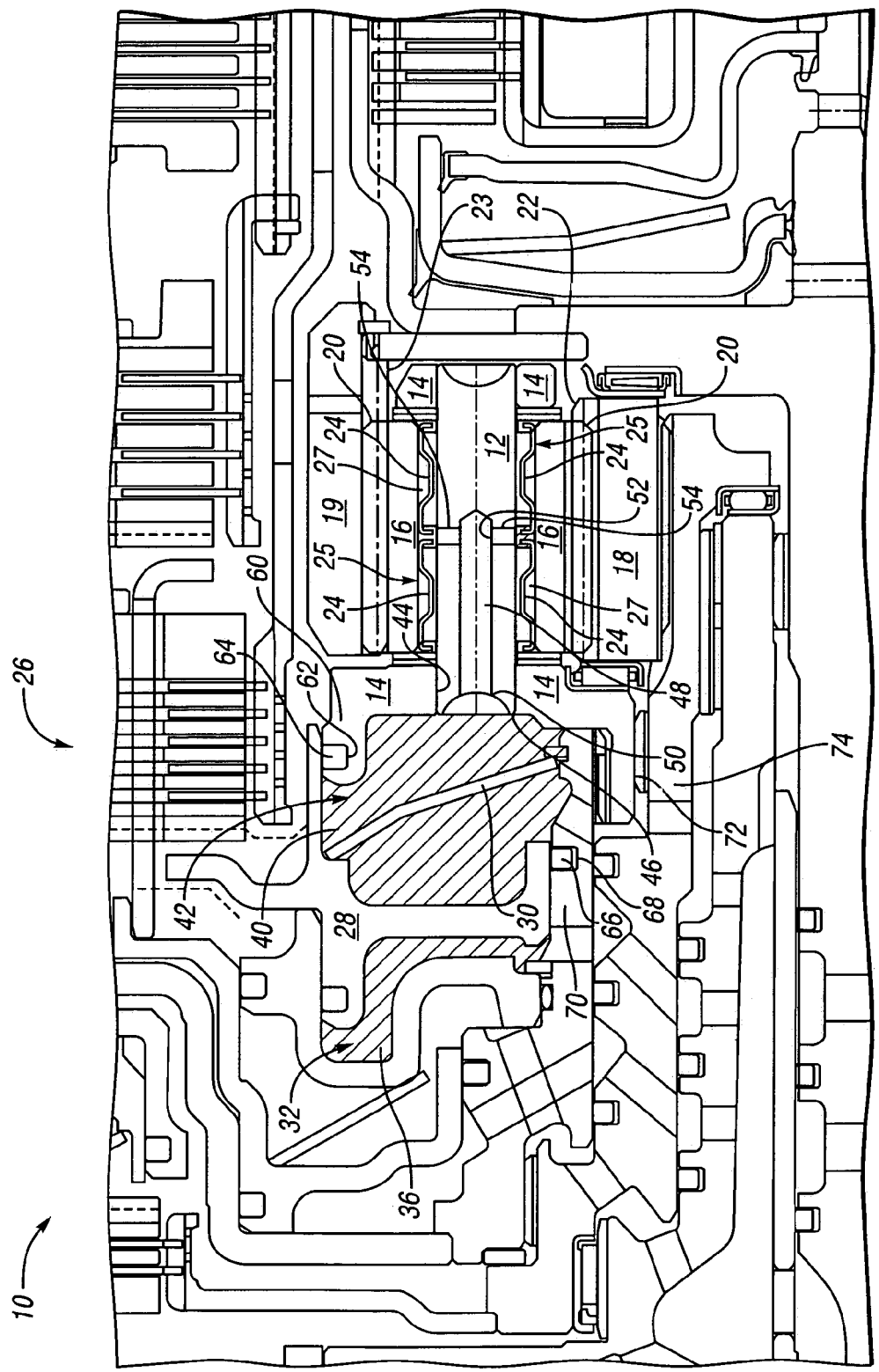
FIG. 1 is a partial cross-sectional view of a transmission including the cooling and lubrication apparatus of the present invention.

Referring to the drawings, wherein like reference numbers refer to like components, FIG. 1 shows a partial cross-sectional view of a 7-speed transmission 10. It should be appreciated that the transmission 10 is shown for exemplary purposes and that the present invention may also be applied to alternate transmission configurations. The transmission 10 includes a pinion shaft 12 supported by a carrier assembly 14 such that the pinion shaft 12 does not rotate relative to the carrier assembly 14. A generally annular pinion gear member 16 circumscribes at least a portion of the pinion shaft 12. The pinion gear 16 includes a plurality of pinion teeth 20 adapted to engage a plurality of sun gear teeth 22 on a sun gear 18, and a plurality of ring gear teeth 23 on a ring gear 19, such that torque is transferable therebetween. A pinion bearing device 25 is disposed between the pinion shaft 12 and the pinion gear 16 to minimize frictional losses as the pinion gear 16 rotates about the pinion shaft 12. The bearing device 25 preferably includes a plurality of bearings 27 retained by a bearing cage 24. According to a preferred embodiment, the bearing device 25 is a needle bearing device; however, other known bearing configurations may be envisioned. It is well known that the bearing device 25 implemented in the manner described must remain cool and well lubricated in order to optimize performance.

The transmission 10 also includes a clutch assembly 26 that may be implemented to produce a plurality of different gear speed ratios. An apply piston 28 is configured to selectively engage or disengage the clutch assembly 26. The apply piston 28 is translatable between the default position shown and an engaged position (not shown) at which the apply piston 28 engages and thereby actuates the clutch assembly 26. A return spring 30 biases the apply piston 28 into the default position at which the clutch assembly 26 is disengaged. An apply chamber 32 is positioned substantially adjacent the apply piston 28.

The clutch assembly 26 is preferably actuated by transferring oil 36 into the apply chamber 32 until the pressure increases enough to overcome the return spring 30 bias and the apply piston 28 is translated from the default position to the engaged position. It is well known that the rotation of the oil 36 within the apply chamber 32 can generate centrifugal forces which make it difficult to precisely control the position of the apply piston 28 and correspondingly the application of the clutch assembly 26. To address this issue, centrifugal dam oil 40 is provided to balance the centrifugal force generated by the oil 36 and thereby improve the controllability of the clutch assembly 26. The centrifugal dam oil 40 is disposed within a balance dam chamber or reservoir 42 partially defined between the apply piston 28 and the carrier assembly 14.

To form the reservoir 42, the carrier assembly 14 includes a carrier flange 60 extending into engagement with the apply piston 28. The carrier flange 60 preferably defines a seal groove 62 which retains a piston seal 64 configured to engage the apply piston 28 such that the centrifugal dam oil 40 does not leak out of the reservoir 42. A second piston seal 66 is preferably disposed within a seal groove 68 defined by a clutch housing 70 and acts to seal the interface between the apply piston 28 and the clutch housing 70. A bushing 72 is preferably disposed between the carrier assembly 14 and a shaft 74, and is configured to support the carrier assembly 14. The bushing 72 is additionally adapted to seal the carrier/shaft interface to prevent centrifugal dam oil 40 from leaking out of the reservoir 42.

The carrier 14 defines an aperture 44 configured to accommodate the pinion shaft 12. The pinion shaft 12 extends through the aperture 44 of the carrier 14 such that an end portion 46 of the pinion shaft 12 comes into contact with the centrifugal dam oil 40. The pinion shaft 12 defines an internal axial channel 48 having an inlet portion 50 near the end portion 46 of the pinion shaft 12, and in fluid communication with the centrifugal dam oil 40. The axial channel 48 extends from the inlet portion 50 along the axis of the pinion shaft 12 to an outlet portion 52 located approximately halfway along the length of the piston shaft 12. The pinion shaft 12 also defines one or more radial channels 54 extending from the outlet portion 52 of the axial channel 48 in a radial direction out of the pinion shaft 12. The radial channels 54 are positioned to align with at least a portion of the bearing device 25 so that centrifugal dam oil 40 is transferable through the radial channels 54 and onto the bearing device 25 such that the bearing device 25 is lubricated and cooled. While the channels 48 and 54 have been described according to a preferred embodiment, it should be appreciated that alternate quantities and/or configurations of channels may be envisioned.

According to the preferred method of the present invention, pressurized centrifugal dam oil 40 is disposed into the reservoir 42 partially defined between the apply piston 28 and the carrier 14. The pressure within the reservoir 42 acts to transfer centrifugal dam oil 40 into the axial channel 48, through the radial channels 54, and onto the bearing device 25. Accordingly, oil 40 from the reservoir 42 is provided to cool and lubricate the bearing device 25 such that the operation thereof is optimized, and the pinion gear 16 is rotatable about the pinion shaft 12 with minimal frictional losses. The amount of centrifugal dam oil 40 transferred onto the bearing device 25 is controllable by varying the size and geometry of the channels 48, 54. It has been observed that enough oil 40 can be transferred to cool and lubricate the bearing device 25 without affecting the primary centrifugal force balancing function of the oil 40.

While the best modes for carrying out the invention have been described in detail, those familiar with the art to which this invention relates will recognize various alternative designs and embodiments for practicing the invention within the scope of the appended claims.

The invention claimed is:

1. A pinion bearing lubrication and cooling apparatus for an automatic transmission comprising:
   an oil reservoir at least partially defined by an apply piston for the transmission and a carrier assembly, wherein the oil reservoir is configured to contain oil;
   a pinion shaft defining a channel, said channel having an inlet portion in fluid communication with the oil and an outlet portion;
   a generally annular pinion gear member circumscribing at least a portion of the pinion shaft; and
   a pinion bearing disposed radially between the pinion shaft and the pinion gear member to facilitate rotation of the pinion gear member relative to the pinion shaft, said pinion bearing aligned with the outlet portion of the channel such that oil transferred through the channel is applied to the pinion bearing wherein the pinion bearing is cooled and lubricated by the oil.

2. The pinion bearing lubrication and cooling apparatus of claim 1, wherein the channel includes an axially extending channel and a radially extending channel.

3. The pinion bearing lubrication and cooling apparatus of claim 1, wherein the pinion bearing is a needle bearing.

4. The pinion bearing lubrication and cooling apparatus of claim 1, wherein the oil is pressurized centrifugal dam oil.

5. The pinion bearing lubrication and cooling apparatus of claim 1, further comprising the carrier assembly supporting the pinion shaft.

6. The pinion bearing lubrication and cooling apparatus of claim 5, wherein the carrier assembly defines a seal groove containing a seal that is configured to retain the oil within the oil reservoir.

7. The pinion bearing lubrication and cooling apparatus of claim 5, further comprising a bushing configured to support the carrier assembly and to seal the oil reservoir.

8. A lubrication and cooling apparatus for a pinion bearing of an automatic transmission comprising:
   a carrier assembly partially defining an oil reservoir;
   oil disposed within the oil reservoir;
   a pinion shaft supported by the carrier assembly, said pinion shaft defining an axially extending channel and a radially extending channel, said axially extending channel having an inlet portion in fluid communication with the oil and an outlet portion, said radially extending channel in fluid communication with the outlet portion of the axial channel;
   a generally annular pinion gear member circumscribing at least a portion of the pinion shaft;
   a pinion bearing disposed radially between the pinion shaft and the pinion gear member to facilitate rotation of the pinion gear member relative to the pinion shaft, said pinion bearing aligned with the radial channel such that oil transferred through the axial channel and the radial channel is applied to the pinion bearing wherein the pinion bearing is cooled and lubricated by the oil; and
   a seal groove defined by the carrier assembly containing a seal that is configured to retain the oil within the oil reservoir.

9. The lubrication and cooling apparatus of claim 8, wherein the bearing device is a needle bearing.

10. The lubrication and cooling apparatus of claim 8, wherein the oil is pressurized centrifugal dam oil.

11. The lubrication and cooling apparatus of claim 8, further comprising a bushing configured to support the carrier assembly and to seal the oil reservoir.

12. A method for cooling and lubricating a pinion bearing device of an automatic transmission comprising:
   providing an apply oil chamber and an oil reservoir fluidly separated by an apply piston;
   wherein each of the apply oil chamber and the oil reservoir contain oil;
   providing a pinion shaft operatively connected to a pinion bearing, said pinion shaft defining an axially extending channel and a radially extending channel, said axially extending channel having an inlet portion in fluid communication with the oil and an outlet portion, said radially extending channel in fluid communication with the outlet portion of the axially extending channel;
   transferring oil from the reservoir into the axial channel;

transferring oil from the axial channel into the radial channel; and transferring oil from the radial channel onto the pinion bearing such that that the pinion bearing is cooled and lubricated by the oil.

13. The method of claim 12, further comprising providing a generally annular pinion gear element operatively connected to the pinion bearing to facilitate the rotation of the pinion gear element relative to the pinion shaft.

14. The method of claim 12, wherein said providing an oil reservoir containing oil includes providing an oil reservoir containing pressurized centrifugal dam oil.

15. The method of claim 12 further comprising:

selectively engaging a clutch assembly with the apply piston by increasing the pressure within the apply oil chamber.

16. The method of claim 15 further comprising:

balancing the pressure placed upon the apply piston from the apply oil chamber by maintaining a pressure within the oil reservoir.

17. The pinion bearing lubrication and cooling apparatus of claim 1, wherein the apply piston at least partially defines an apply oil chamber, and wherein the apply oil chamber and the oil reservoir are fluidly separated by the apply piston.

18. The pinion bearing lubrication and cooling apparatus of claim 17, wherein an apply piston return spring is located within the oil reservoir to bias the apply piston to a disengaged position.

* * * * *